United States Patent [19]

Andersen

[11] Patent Number: 5,111,579
[45] Date of Patent: May 12, 1992

[54] METHOD FOR MAKING A FRAMELESS ACOUSTIC COVER PANEL

[75] Inventor: Carl W. Andersen, Grand Rapids, Mich.

[73] Assignee: Steelcase Inc., Grand Rapids, Mich.

[21] Appl. No.: 450,917

[22] Filed: Dec. 14, 1989

[51] Int. Cl.$^5$ ............................................. B23P 17/00
[52] U.S. Cl. ........................... 29/897.32; 29/897.3; 29/419.1; 29/447; 156/222; 156/308.2; 52/144; 428/121; 428/126; 428/193; 428/284
[58] Field of Search ............... 29/897.3, 897.32, 419.1, 29/446, 447, 521, 525.1; 156/222, 308.2; 160/351; 52/144, 145, 509, 511; 428/83, 121, 124, 126, 192, 193, 284, 296

[56] References Cited

U.S. PATENT DOCUMENTS

| | | | |
|---|---|---|---|
| 1,438,966 | 12/1922 | Perry . | |
| 2,363,323 | 11/1944 | Hill | 154/2.6 |
| 3,307,990 | 3/1967 | Homier et al. | 156/72 |
| 3,328,927 | 7/1967 | Kates | 52/65 |
| 3,408,239 | 10/1968 | Wedin | 156/62.8 |
| 3,428,506 | 2/1969 | Johnstone | 156/148 |
| 3,706,171 | 12/1972 | Shayman | 52/475 |
| 3,831,330 | 8/1974 | Tacke et al. | 52/220 |
| 3,993,828 | 11/1976 | McCorsley, III | 428/236 |
| 4,123,879 | 11/1978 | Blodee et al. | 52/36 |
| 4,135,341 | 1/1979 | Johnson et al. | 52/316 |
| 4,144,924 | 3/1979 | Vanden Hoek | 160/231 |
| 4,169,176 | 9/1979 | Hartmann et al. | 428/95 |
| 4,199,635 | 4/1980 | Parker | 428/95 |
| 4,219,598 | 8/1980 | Noma et al. | 428/161 |
| 4,251,104 | 2/1981 | Holt | 29/401.1 |
| 4,258,093 | 3/1981 | Benedyk | 428/85 |
| 4,277,531 | 7/1981 | Picone | 428/228 |
| 4,282,283 | 8/1981 | George et al. | 428/228 |
| 4,302,499 | 11/1981 | Crisch | 428/236 |
| 4,307,145 | 12/1981 | Goldman | 428/247 |
| 4,359,132 | 11/1982 | Parker et al. | 181/169 |
| 4,373,001 | 2/1983 | Smith et al. | 428/212 |
| 4,391,865 | 7/1983 | Constance | 428/74 |
| 4,424,250 | 1/1984 | Adams et al. | 428/198 |
| 4,432,822 | 2/1984 | Adams et al. | 156/148 |
| 4,445,954 | 5/1984 | Adams et al. | 156/148 |
| 4,474,840 | 10/1984 | Adams | 428/71 |
| 4,491,617 | 1/1985 | O'Connor et al. | 428/236 |
| 4,515,848 | 5/1985 | Leunig et al. | 428/172 |
| 4,581,272 | 4/1986 | Walters et al. | 428/88 |
| 4,635,410 | 1/1987 | Chumbley | 52/63 |
| 4,726,987 | 2/1988 | Trask et al. | 428/282 |
| 4,744,189 | 5/1988 | Wilson | 52/511 |

*Primary Examiner*—P. W. Echols
*Assistant Examiner*—David P. Bryant
*Attorney, Agent, or Firm*—Price, Heneveld, Cooper, DeWitt & Litton

[57] ABSTRACT

A formed panel construction and method are provided for portable acoustic partitions of the type which are assembled and configured to create workstations in open office plans. Each partition panel includes a free-standing, open frame with a pair of formed cover panels detachably connected to the opposite sides of the frame to enclose the partition. Each cover panel comprises a laminated composite sheet, which includes a sound absorbant backing sheet constructed from heat fusible fibers, and an overlying upholstery sheet with a finished exterior surface. The composite sheet is heated to soften or plasticize the heat fusible fibers, and is compressed and molded while heated to a predetermined geometrically solid shape, such as a five-sided panel having a flat face and four marginal flanges extending at an angle therefrom. The heat and compression process interconnects the various layers of the composite sheet, and the molded shape creates a one-piece, frameless acoustic cover panel with a stiffness or rigidity which facilitates manual handling, and suspension attachment to the frame without sagging.

39 Claims, 8 Drawing Sheets

METHOD FOR MAKING A FRAMELESS ACOUSTIC COVER PANEL

BACKGROUND OF THE INVENTION

The present invention relates to office partition panels and the like, and in particular to a formed panel construction and method therefor.

Partition panels are used extensively in offices and other similar environments to divide the available building space into individual workstations. Most such partition panels have acoustic properties to absorb and attenuate sound in the workstations.

Heretofore, most partition panels have had a conventional, upholstered type of construction, wherein the exterior surfaces and edges of a rigid backing board or frame are covered with a padding and an upholstery fabric or textile. Examples of presently existing partition panel constructions are disclosed in U.S. Pat. Nos. 3,831,330 and 4,144,924. In such partition panels, a sheet of padding material is typically attached to the exterior side of the frame. Upholstery fabric is then stretched across the exterior face of the padding, and is then wrapped around the marginal edges of the cover frame, and attached to the rear surface of the cover frame by suitable fasteners, such as staples, tacks, adhesives, or the like. The upholstered panels are then attached to a freestanding, main frame portion of the panel by clips, screws, or other similar fasteners.

The main frame typically includes a pair of rigid side posts, with internal reinforcing to provide a rigid freestanding structure in which the upholstered panels are received and fixedly retained. A top cap and a pair of side trim members are mounted on the frame, and cover the top and side edges of both of the upholstered panels to present a neat, flush, finished appearance.

Such conventional partition panel constructions are not particularly economical to manufacture, especially in view of their conventional upholstered design. Furthermore, since the upholstered panels have their own separate frame or substrate, they are relatively heavy, which reduces efficiencies in handling, assembly and use. Also, when directional fabric is used as a decorative surface, conventional upholstery techniques require substantial time and effort to avoid skewing the fabric pattern. The use of conventional fasteners to attach the upholstered panels to the frame also limits their adaptability, and design options.

While molded laminate constructions have been used in some non-related industries, such as for automatic headliners, trim parts, and the like, such parts are typically mounted in a marginal frame to retain their shape, and have their finished surface dispensed on the concave side of the part.

SUMMARY OF THE INVENTION

One aspect of the present invention is to provide a one-piece, molded, frameless cover panel for portable acoustic room partition panels of the type which include a freestanding frame. Each cover panel comprises a laminated composite sheet that has a sound absorbing backing sheet constructed from heat fusible fibers, and an overlying upholstery sheet with a finished exterior surface. The composite sheet is compressed while heated to a temperature which softens or plasticizes the heat fusible fibers in the backing sheet, and is creased along predetermined crease lines spaced inwardly from the marginal edges of the composite sheet to form integral flanges bent inelastically inwardly from the crease lines at a selected angle to the remaining generally planar portion of the composite sheet. The formed composite sheet creates a one-piece, frameless acoustic cover panel with a predetermined geometrically solid shape that is relatively stiff or rigid to facilitate manual handling of the cover panel and mounting on the frame without sagging.

Another aspect of the present invention is a method for making acoustic cover panels for portable room partitions and the like of the type having a freestanding frame with at least one acoustic cover panel connected with and enclosing an associated side of the frame. The method comprises providing a sound absorbing backing material having heat fusible fibers, and cutting a backing sheet from the backing material. An upholstery material is provided with a finished exterior surface, and an associated upholstery sheet is cut from the same to a size commensurate with the backing sheet. The backing sheet and upholstery sheet are assembled and indexed so that their marginal edges are generally aligned, and wherein the sheets collectively define a composite sheet. The composite sheet is heated to soften or plasticize the heat fusible fibers in the backing sheet, and is then formed while heated by creasing outer portions of the composite sheet along predetermined crease lines spaced inwardly from the marginal edges of the composite sheet to form integral flanges which are bent inelastically inwardly from the crease lines at a selected angle to the remaining generally planar portion of the composite sheet. The formed composite sheet creates a one-piece, frameless, molded cover panel with a predetermined geometrically solid shape adapted to mate with and cover one side of the panel frame. The formed composite sheet is cooled while in the predetermined geometrically solid shape, such that the composite sheet permanently assumes its formed shape. The forming process stiffens and rigidifies the one-piece, frameless cover panel to a degree which facilitates manual handling of the same and attachment to the frame without sagging.

For high speed production, a web of backing material and a web of upholstery material may be laminated together in a roll of composite material before the cutting operation. The backing sheet and the upholstery sheet are then cut simultaneously from the web of composite material.

The present invention is particularly adapted for use with directional and/or decorative fabrics. The composite sheet stabilizes the decorative fabric by maintaining its orientation and position after molding. The process allows quick, accurate, and consistent alignment of directional fabric patterns from one panel to the next, and also reduces assembly time.

The principal objects of the present invention are to provide a molded, one-piece, frameless cover panel construction and method, which is economical to manufacture and has a unique appearance. Each cover panel comprises a laminated composite sheet, which when heated and molded, assumes a predetermined geometrical solid shape that is relatively stiff and rigid to facilitate manual handling and attachment to the frame. The subject cover panels are lightweight, and are preferably detachably connected to the frame to facilitate color and texture coordination and reconfiguration. The cover panels are suspended or hung on the frame by their marginal edges, yet do not sag or bow despite their lightweight frameless construction. The cover panels are durable, and have a relatively uncomplicated design that permits even unskilled personnel to attach the same to the panel frame. The overall panel construction is relatively lightweight, yet has substantial sound absorption capabilities.

Preferably, the cover panels include a thick sound absorbing sheet attached to their rear side thereof for even greater acoustic properties. Furthermore, a fire retardant sheet is preferably interposed between the backing and fabric sheets for improved safety. Directional fabrics can be applied to the cover panels in a neat, and consistently aligned fashion, without burdensome effort or expense. The molded frameless cover panel is particularly adapted for use in conjunction with an open frame partition panel construction, is efficient in use, and capable of a long operating life.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
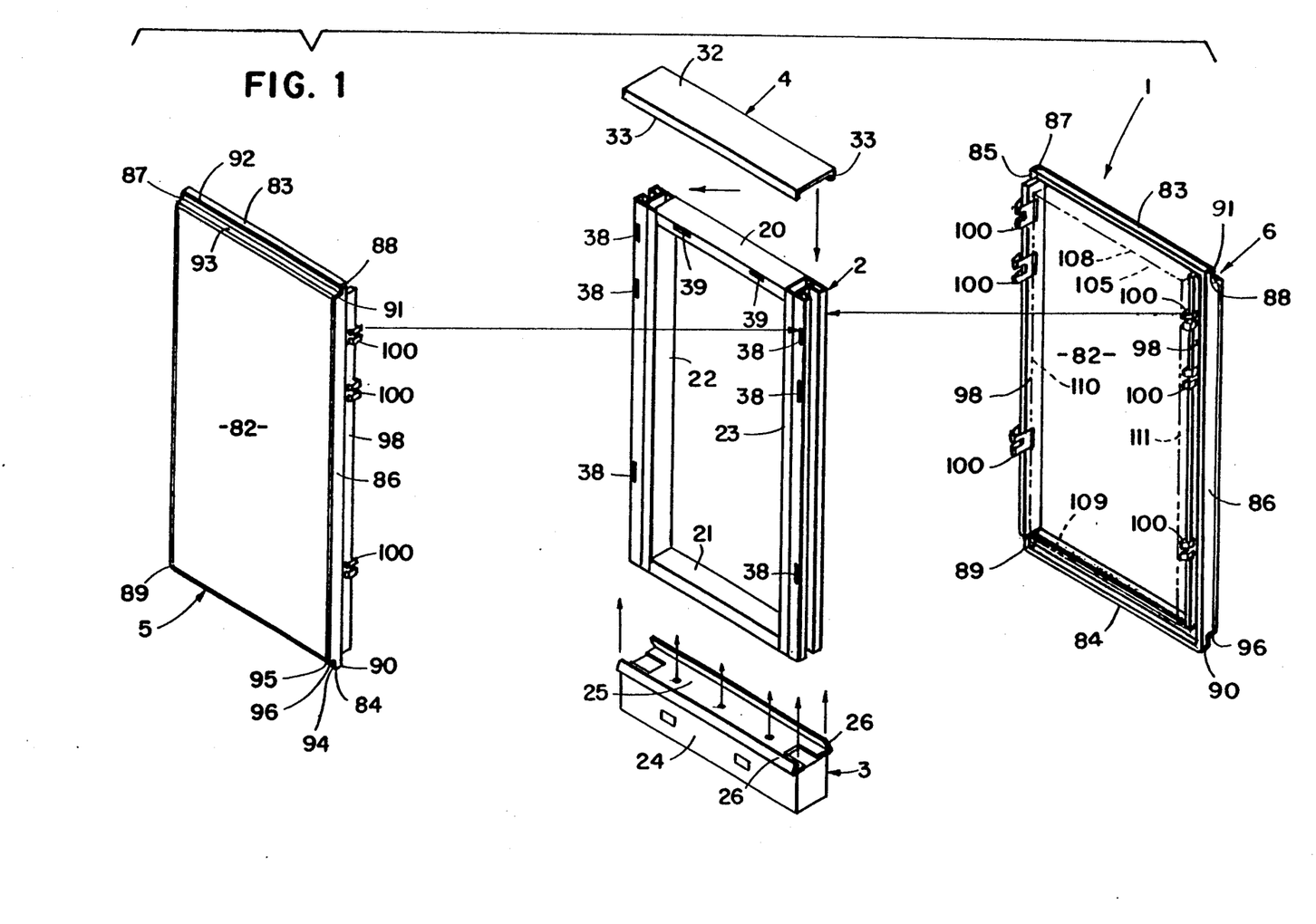
FIG. 1 is an exploded perspective view of a partition panel construction embodying the present invention.
Figure 2:
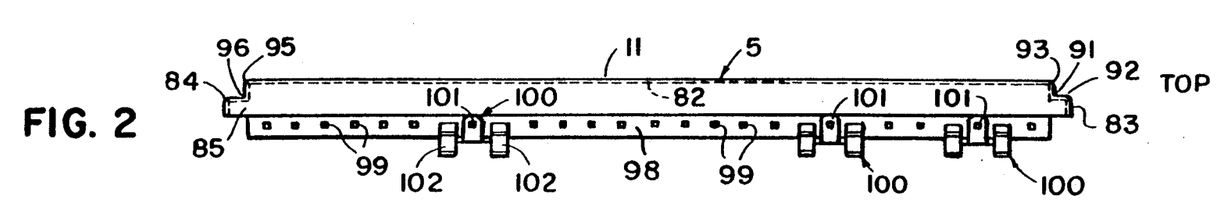
FIG. 2 is a side elevational view of a cover panel portion of the partition construction.
Figures 3, 4, 5:
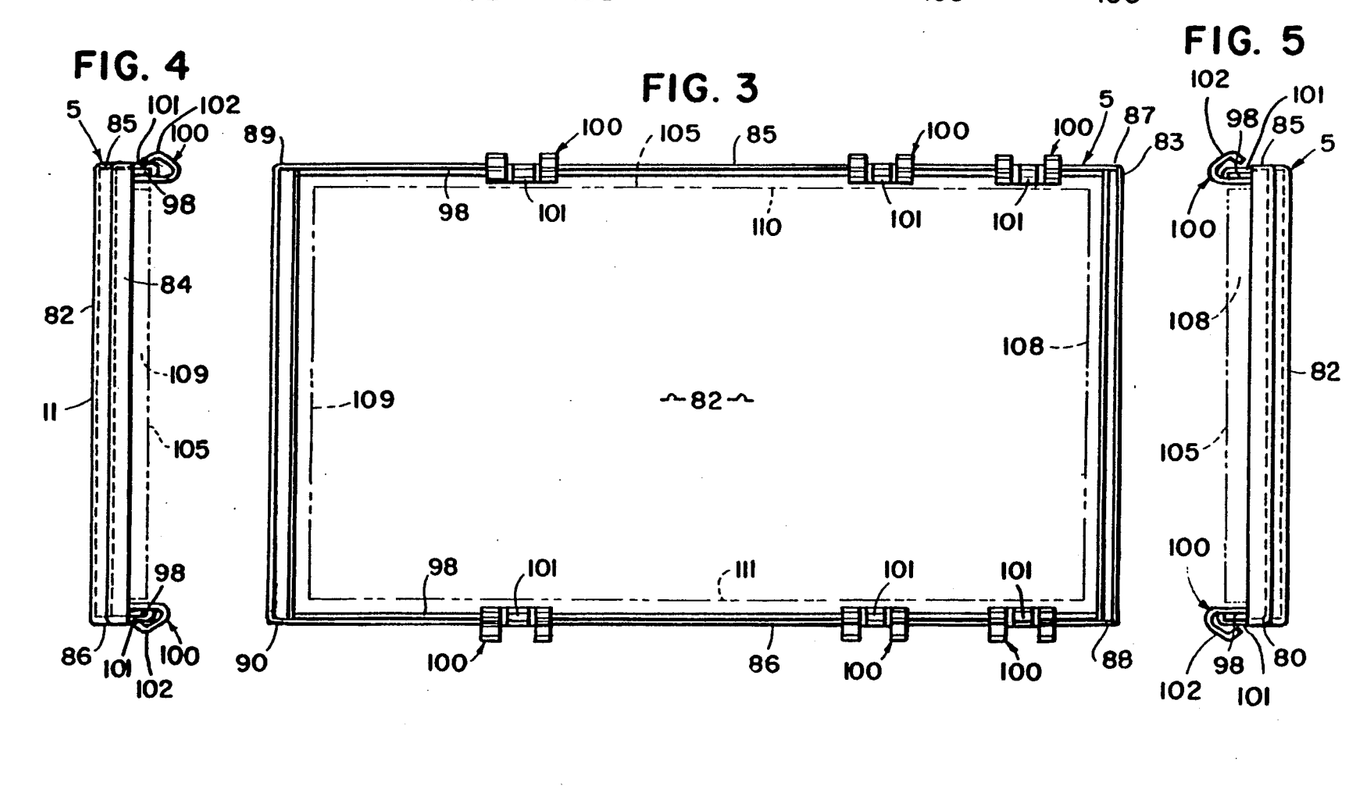
FIG. 3 is a rear elevational view of the cover panel.
FIG. 4 is a bottom plan view of the cover panel.
FIG. 5 is a top plan view of the cover panel.
Figures 6, 7, 9:
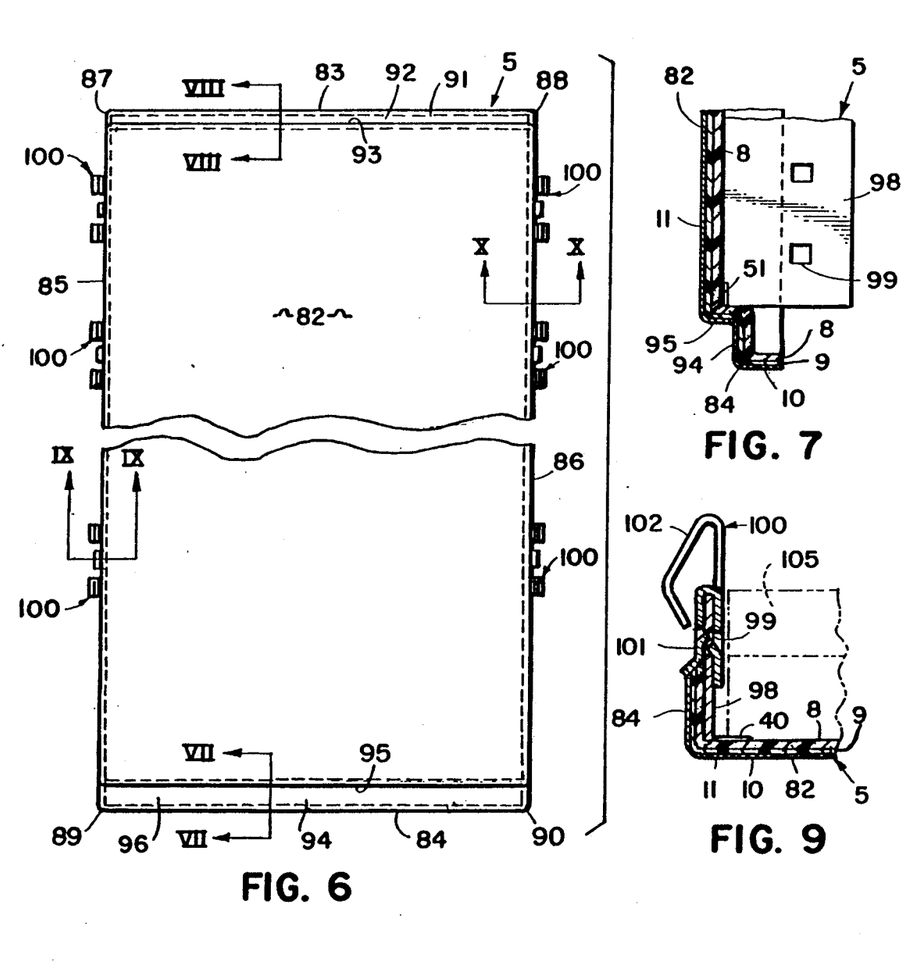
FIG. 6 is a fragmentary, front elevational view of the cover panel.
FIG. 7 is an enlarged fragmentary, cross-sectional view of the cover panel, taken along the line VII—VII of FIG. 6.
FIG. 9 is an enlarged, fragmentary, cross-sectional view of the cover panel, taken along the line IX—IX of FIG. 6.
Figure 8:
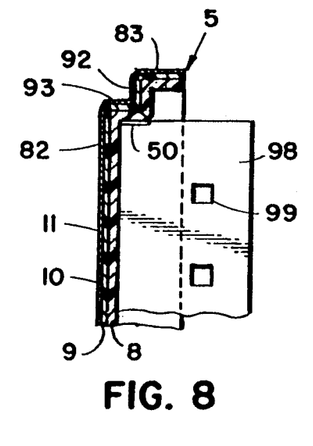
FIG. 8 is an enlarged, fragmentary, cross-sectional view of the cover panel, taken along the line VIII—VIII of FIG. 6.
Figure 10:
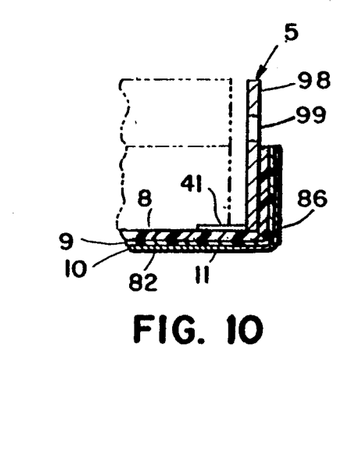
FIG. 10 is an enlarged, fragmentary, cross-sectional view of the cover panel, taken along the line X—X of FIG. 6.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein, are not to be considered as limiting, unless the claims expressly state otherwise.

Figure 27:
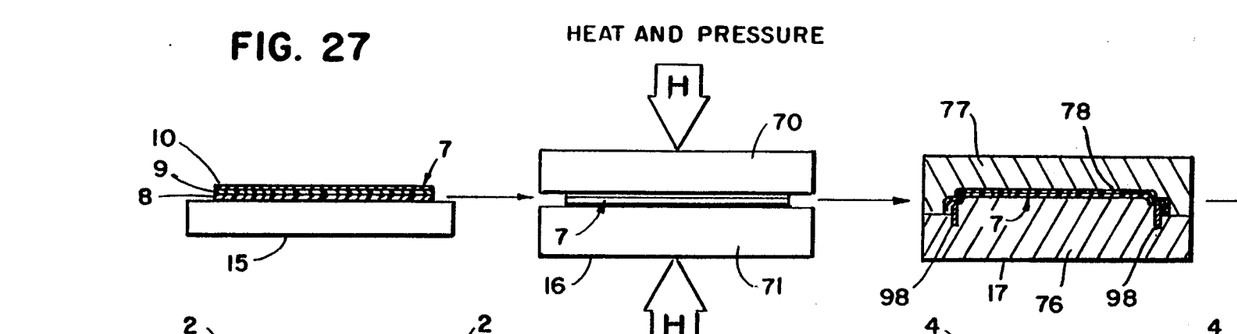
FIG. 27 is a diagrammatic view of a method embodying the present invention wherein the various layers of the composite sheet are indexed, heated, compressed, molded, and cooled.
Figure 28:
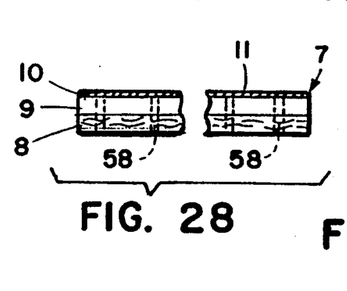
FIG. 28 is an enlarged, fragmentary cross-sectional view of the composite sheet after compression and molding.

The reference numeral 1 (FIG. 1) generally designates a formed partition panel construction embodying the present invention. Panel construction 1 comprises an open, freestanding frame 2 having a base 3 and a top cap or trim strip 4. A pair of frameless, formed cover panels 5 and 6 are detachably connected to the opposite sides of frame 2, and enclose the partition 1. The cover panels 5 and 6 are interchangeable, and each comprises a laminated composite sheet 7 (FIG. 20), which in the illustrated example, includes a sound absorbing backing sheet 8 constructed from heat fusible fibers, a fire retardant sheet 9, and an overlying upholstery sheet 10 with a finished exterior surface 11. In an assembled sheet process embodiment of the present invention, the various sheets 8-10 of the composite sheet 7 are assembled and indexed at an assembly station 15 (FIG. 27). In a preformed laminate process embodiment of the present invention, the various sheets 8-10 of the composite sheet 7 are cut simultaneously from a multi-layer web of composite material, wherein the various layers are indexed and aligned during lamination. The resultant composite sheets 7 are then heated and compressed at a heat and pressure station 16, which softens the heat fusible fibers in backing sheet 8, and provides an initial bonding between sheets 8-10. The heated composite sheet 7 is quickly transferred to a forming station 17, wherein the heated composite sheet 7 is further compressed and molded into a predetermined geometrically solid shape, such as the illustrated five-sided cover panels 5 and 6 The heat and compression process further interconnects the various sheets 8-10 of composite sheet 7, and molds the shape of the one-piece frameless acoustic cover panels 5 and 6 in a manner which provides a stiffness or rigidity which facilitates manual handling, and attachment to panel frame 2 without sagging or bowing.

When directional fabrics are used, such as stripes, patterns, and the like, indexing of composite sheet 7 into forming station 17 provides consistent alignment of the directional fabric pattern from one panel to the next.

The illustrated panel frame 2 (FIG. 1) has an open type of construction, comprising a top rail 20, a bottom rail 21, and opposite side rails 22 and 23, all of which are fixedly interconnected to provide an open, generally rectangular elevational configuration to frame 2. Base 3 includes a pair of detachable covers 24, and an upper plate 25 with upstanding base flanges 26 extending along opposite sides thereof. Base 3 is attached to the lower surface of bottom rail 21 by conventional means, such as threaded fasteners 27 (FIG. 12) or the like. The flanges 26 of base plate 25 are spaced laterally apart from the opposite sides of bottom rail 21 to form a pair of base channels 28 in which associated lower portions of cover panels 5 and 6 are captured, or received and retained in the manner illustrated in FIGS. 11 and 12, and described in greater detail hereinafter.

Figure 12:
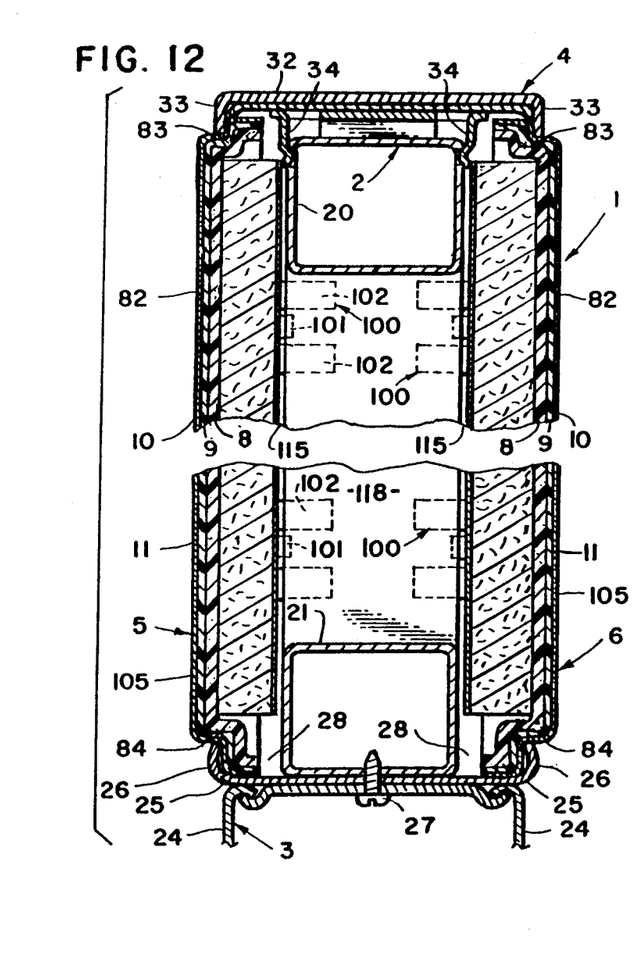
FIG. 12 is a fragmentary, vertical cross-sectional view of the panel construction, particularly showing a pair of cover panels fully installed on the panel frame.

Top cap or trim member 4 (FIG. 1) has an inverted U-shaped end elevational configuration, comprising a center web 32 with a pair of depending flanges 33 extending along opposite sides thereof. As best illustrated in FIG. 12, the flanges 33 of top cap 4 are laterally spaced apart a preselected distance so as to receive therein and capture mating top portions of cover panels 5 and 6 in the manner illustrated in FIG. 12, and described in detail hereinafter. A preselected number of spring clips 34 extend downwardly from the interior or lower surface of cap web 32, and serve to removably attach top cap 4 to the top rail 20 of panel frame 2.

In the embodiment illustrated in FIGS. 1-25, both of the side rails 22 and 23 in panel frame 2 include three longitudinally extending slots 38, two of which are disposed adjacent the upper portion of the associated side rail, and one of which is disposed adjacent the lower portion of the associated side rail. Each of the slots 38 is adapted to receive therein a fastener associated with cover panels 5 and 6, as described below. Slots 38 are positioned laterally to the extreme outer sides of side rails 22 and 23 to facilitate interconnecting adjacent cover panels 5 without any frames or side trim pieces in the manner described in detail below. The top rail 20 of panel frame 2 includes a preselected number of longitudinally extending slots 39, which are shaped and positioned to receive therein the spring clips 34 on the lower surface of top cap 4 to detachably mount top cap 4 on panel frame 2.

Cover panels 5 and 6 are substantially identical in shape, size and construction, such that for ease of description herein, reference will be had only to the left-hand cover panel 5, as viewed in FIG. 1. However, it is to be understood that the detailed description and reference numerals disclosed herein is equally applicable to right-hand cover panel 6, as well as to other like cover panels.

In the illustrated example, cover panel 5 is constructed from a laminated or multiple layer, sandwiched composite sheet 7, which as best illustrated in FIGS. 13-18, comprises backing sheet 8, fire retardant sheet 9, and upholstered sheet 10. The three sheets 8, 9 and 10 may be separately formed, and then assembled in the assembled sheet process described below, and illustrated in FIGS. 13-19. Alternatively, the three sheets 8, 9 and 10 may be formed contemporaneously from a roll of three-ply laminate in the preformed laminate process described below, and illustrated in FIG. 21.

Assembled Sheet Process

The illustrated backing sheet 8 (FIGS. 13-15) has a generally rectangular plan configuration, comprising an exterior surface 44, an interior surface 45, and top, bottom and side marginal edges 46-49 respectively. In this embodiment of the present invention, the marginal edges 46-49 of backing sheet 8 are preferably cut to their final dimensions or pretrimmed, so as to avoid any subsequent trimming of the panel edges after the molding process. Backing sheet 8 is preferably constructed from a synthetic resin material having at least some heat fusible fibers to facilitate both lamination of sheets 8-10, as well as molding of the resultant composite sheet 11. In one working example of the present invention, backing sheet 8 comprises a sheet of non-woven polyester material, such as spun bond or the like, having a thickness in the range of 0.060 to 0.140 inch. The noted polyester material has a thermoplastic binder which when exposed to the heating and compressing step described below, serves to provide a more secure bond between the backing sheet 8 and fire retardant sheet 9, and also facilitates permanent compression and molding of composite sheet 7.

Figure 13:
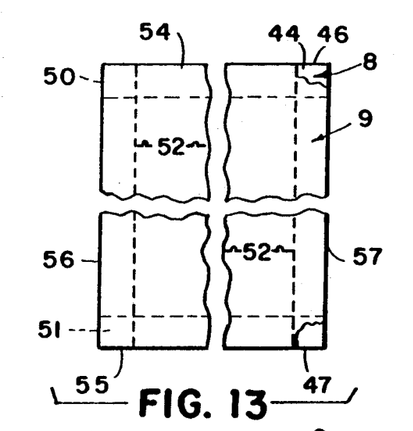
FIG. 13 is a fragmentary, front elevational view of backing sheet and fire retardant sheet laminated together.
Figure 14:
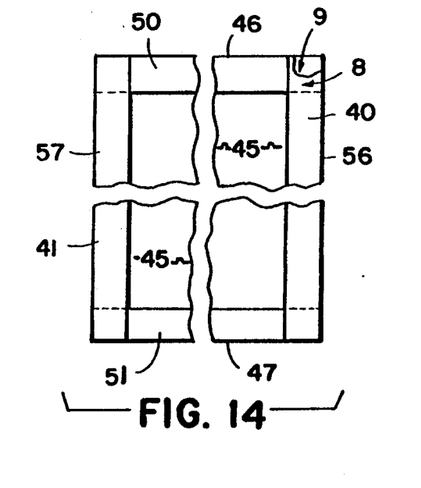
FIG. 14 is a fragmentary, rear elevational view of the laminated backing sheet and fire retardant sheet illustrated in FIG. 13.

The backing sheet 8 illustrated in FIGS. 13 and 14 has a pair of resin strips 50 and 51 on the interior surface 45 thereof extending along the top and bottom edges 46 and 47 of backing sheet 8. Resin strips 50 and 51 comprise thin layers of PVC, or the like, with a width slightly greater than the width of the corresponding top and bottom flanges 82 and 83, and serve to further stiffen the same. Preferably resin strips 50 and 51 are applied to an entire roll of backing material to expedite processing, as described in greater detail below. Other types of stiffening strips, such as lengths of polyester material (not shown) may also be used.

Figures 21, 22, 23, 24, 25, 26:
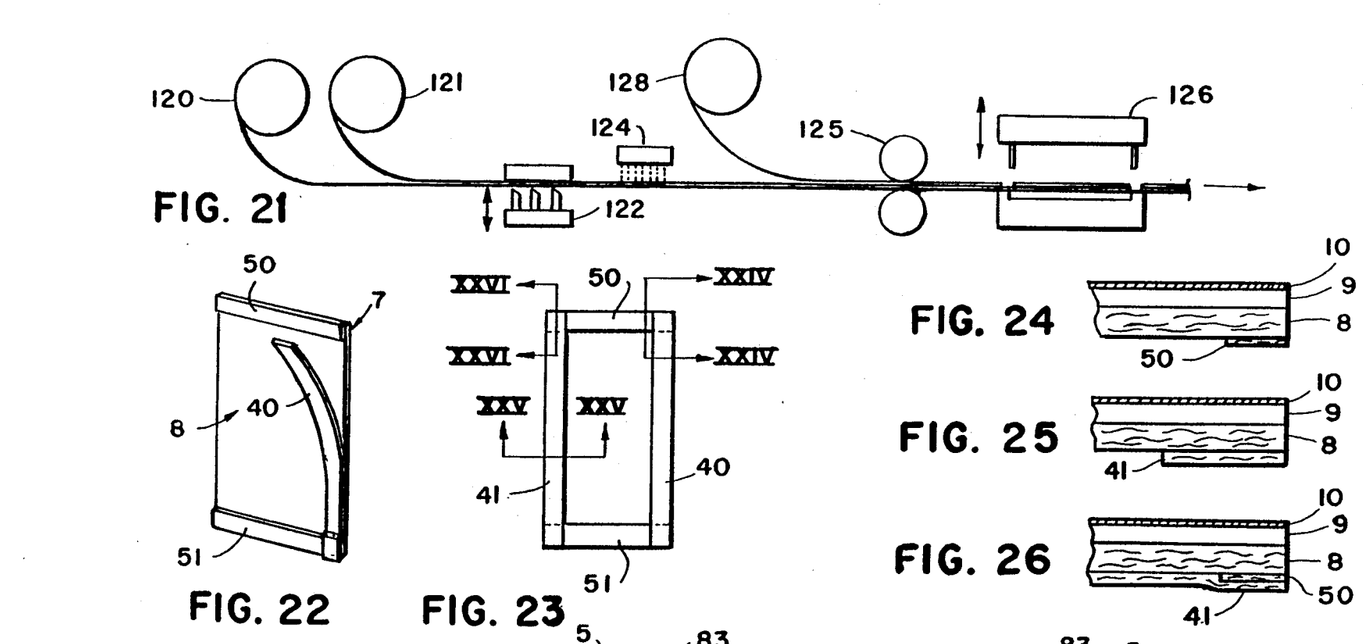
FIG. 21 is a schematic illustration of a method for preforming rolls of laminate from which a plurality of composite sheets are cut.
FIG. 22 is a partially schematic perspective view of a composite sheet with a vertical stiffening strip being applied along one side edge of the composite sheet.
FIG. 23 is a partially schematic rear elevational view of the composite sheet of FIG. 22, with vertical stiffening strips applied along both side edges of the composite sheet.
FIG. 24 is an enlarged, fragmentary cross-sectional view of the composite sheet, taken along the line XXIV—XXIV of FIG. 23.
FIG. 25 is an enlarged, fragmentary cross-sectional view of the composite sheet, taken along the line XXV—XXV of FIG. 23.
FIG. 26 is an enlarged, fragmentary cross-sectional view of the composite sheet, taken along the line XXVI—XXVI of FIG. 23.

The backing sheet 8 illustrated in FIGS. 13 and 14 also has a pair of stiffening strips 40 and 41 on the interior surface 45 thereof extending along the side edges 48 and 49 of backing sheet 8. The illustrated stiffening strips 40 and 41 comprise strips of synthetic resin material, preferably, the same non-woven polyester material from which backing sheet 8 is constructed. Stiffening strips 40 and 41 have a width slightly greater than the width of the corresponding side flanges 85 and 86, and a thickness somewhat less than the thickness of backing sheet 8, such as approximately one-half. Hot melt adhesive, or other suitable fastening means, may be used to attach stiffening strips 40 and 41 to the interior surface 45 of backing sheet 8. Stiffening strips 40 and 41 may be applied to the laminated composite sheet 7 after assemblage of the same, and after application of resin strips 50 and 51, but prior to the heat and pressure steps, as illustrated in FIG. 22. In this embodiment, the corners of cover panels 5 and 6 are double stiffened by underlying resin strips 50 and 51, and overlying stiffening strips 40 and 41, which facilitates rigidification of cover panels 5 and 6.

The illustrated fire retardant sheet 9 (FIGS. 13-15) also has a rectangular plan configuration similar to that of backing sheet 8, and includes an exterior surface 52, an interior surface 53, and top, bottom and opposite side marginal edges 54-57 respectively. Fire retardant sheet 9 is preferably constructed from a nonflammable material to provide additional safety to the partition panel 1. In one working example of the present invention, fire retardant sheet 9 comprises a sheet of non-woven glass fiber material having a thickness in the range of 0.010 to 0.030 inch. The noted glass fiber material has a thermoplastic binder which softens when heated during the heating and compressing step to provide a more secure bond between fire retardant sheet 9, and the adjacent upholstery sheet 10 and backing sheet 8. Like backing sheet 8, the marginal edges 54-57 of fire retardant sheet 9 are preferably cut to their final shape or pretrimmed, so as to avoid any subsequent trimming of the panel edges after the molding step.

Figure 15:
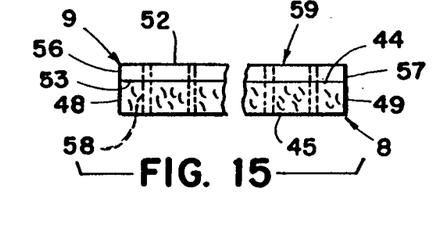
FIG. 15 is an enlarged, fragmentary, cross-sectional view of the laminated sheet.
Figure 16:
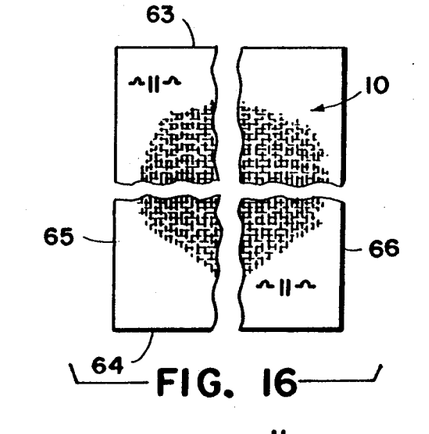
FIG. 16 is a fragmentary, top plan view of a fabric sheet.
Figure 17:
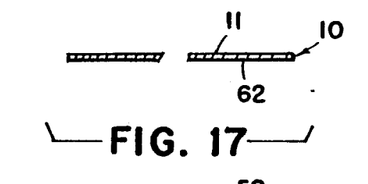
FIG. 17 is an enlarged, fragmentary, cross-sectional view of the fabric sheet.
Figure 19:
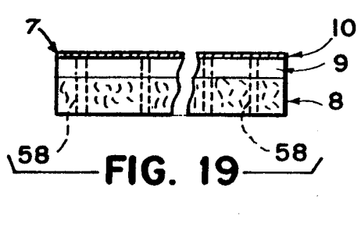
FIG. 19 is an enlarged, fragmentary, cross-sectional view of the composite sheet prior to forming.

Preferably, the marginal edges 46-49 of backing sheet 8 and 54-57 of fire retardant sheet 9 are indexed into alignment, and backing sheet 8 and fire retardant sheet 9 are then temporarily interconnected by means such as the needling pierces 58 illustrated in FIGS. 15 and 19, so as to maintain their indexed alignment during transport, storage, and the like. Alternatively, backing sheet 8 and fire retardant sheet 9 may be preassembled and interconnected by means such as needling or the like to form a unitary intermediate sheet 59, and then trim the marginal edges of the resultant intermediate sheet 59. In either case, it is preferred that the associated backing sheet 8 and fire retardant sheet 9 are indexed on top of one another, and then temporarily interconnected, so that they will not move out of alignment during the molding process. This process alleviates the need for any trimming of the marginal edges of the final cover panel after it has been formed.

The illustrated upholstery sheet 10 (FIGS. 16-17) also has a rectangular plan configuration similar to that of associated backing sheet 8 and fire retardant sheet 9, and includes a finished exterior surface 11, an interior surface 62, and top, bottom, and opposite side marginal edges 63-66 respectively. Upholstery sheet 10 is preferably constructed from a conventional upholstery fabric, such as woven textiles and the like.

A thermoplastic or thermosetting adhesive, such as PVC or the like, may be used to securely attach upholstery sheet 10 to fire retardant sheet 9. In the example illustrated in FIG. 20, a thin layer 68 of thermoplastic adhesive is sprayed onto the exterior surface of fire retardant sheet 9. During the heating and compressing step, the thermoplastic layer 68 is softened and compressed into the adjacent fibers of the upholstery sheet 10 and fire retardant sheet 9 to create a secure mechanical bond therebetween. In the event the binder in fire retardant sheet 9 is sufficient to achieve a good bond between sheets 9 and 10, the layer 68 of adhesive may not be required.

Figure 18:
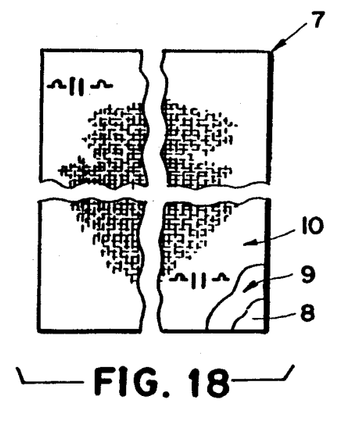
FIG. 18 is a fragmentary, top plan view of a composite sheet wherein the fabric sheet has been placed overlying the laminate sheet.

With reference to FIGS. 18 and 19, cover panel 5 is formed by first assembling an associated backing sheet 8, fire retardant sheet 9, and upholstered sheet 10, as previously noted. Preferably, backing sheet 8 and fire retardant sheet 9 are preassembled as a unit in the form of intermediate sheet 59 to facilitate handling and insure proper indexing. In the illustrated example, an intermediate sheet 59 is placed on top of sheet assembly station 15, with the interior surface 45 of backing sheet 8 facing downwardly. An associated upholstery sheet 10 is then placed on top of intermediate sheet 59, with the exterior surface 52 of fire retardant sheet 9 disposed adjacent the interior surface 62 of upholstery sheet 10, and the exterior surface 11 of upholstery sheet 10 facing upwardly. The marginal edges of intermediate sheet 59 and upholstery sheet 10 are carefully aligned to collectively define the composite sheet 7.

A light roll or press operation may be applied to composite sheet 7 after assembly and indexing to insure that upholstery sheet 10 remains aligned on intermediate sheet 59 prior to compression and forming. However, the adhesion obtained by the rolling operation will preferably permit upholstery sheet 10 to slide or slip somewhat on intermediate sheet 59 to alleviate bunching at the edges and corners of cover panel 5 during molding.

Pre-formed Laminate Process

The pre-formed laminate process illustrated in FIG. 21 provides a high speed method for efficiently producing a plurality of assembled composite sheets 7. With reference to FIG. 21, the illustrated method provides a roll 120 of backing material, and a roll 121 of fire retardant material arranged in an adjacent relationship. The backing and fire retardant materials are payed off of their associated rolls into an aligned, overlying relationship, and transferred by means such as a conventional belt conveyor (not shown) to a needling station 122, wherein the two sheets of material are needled together in an aligned condition. A roll 123 of upholstery fabric is positioned downstream of needling station 122. The upholstery material is payed from roll 123 onto the exterior surface of the fire retardant material. In the process illustrated in FIG. 20, an adhesive dispensing station 124 is positioned operationally between needling station 122 and upholstery fabric roll 123, and serves to deposit a thermoplastic or thermosetting adhesive, such as PVC or the like on the exterior surface of the fire retardant material to securely attach the upholstery material thereto.

As the upholstery fabric material is laid onto the underlying web of needled backing and fire retardant material, it is aligned thereon, with particular care being given to directional fabrics, such as patterns, weaves, and the like to insure that they are properly positioned to match adjacent panels. In the example illustrated in FIG. 21, a roller compression station 125 is located operationally downstream of upholstery fabric roll 123, and serves to lightly press the three webs of material together to insure that the upholstery material remains properly aligned prior to compression and forming.

Figure 20:
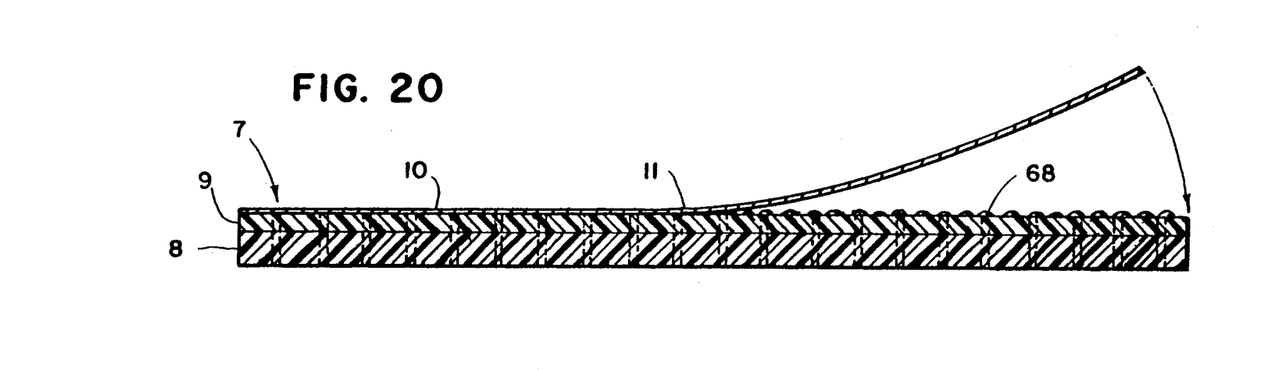
FIG. 20 is an enlarged, cross-sectional view of the composite sheet illustrating assembly of the same.

In the preformed laminate process of FIG. 20, a die cutting station 126 is located downstream of compression station 125, and includes vertically reciprocating die halves. The three-layer web of material passes between the die halves of cutting station 125, and the three sheets 8, 9 and 10 are cut contemporaneously from the preformed multi-layer web.

The horizontal resin strips 50 and 51 may be preformed on the interior surface of the backing material prior to formation of roll 120 by a conventional, continuous roller or spray operation. Alternatively, resin strips 50 and 51 may be formed on the backing material in a continuous feed operation after it is payed from roll 120, but before the multi-layer web is cut at cutting station 126.

In the example illustrated in FIGS. 21 and 23, the vertical stiffening strips 40 and 41 are assembled after the individual composite sheets 7 are cut. This assembly step may be performed at the assembly station 15 illustrated in FIG. 27.

It is to be understood that while resin strips 50 and 51 and stiffening strips 40 and 41 help rigidity of the cover panels 5 and 6, and assist in retaining their molded shape, that such reinforcement may be accomplished in a variety of other ways, or may be eliminated, due to the inherently rigid geometrical shape of the cover panels.

Molding of Composite Sheets

Whether produced by either the assembled sheet process, or by the preformed laminate process, the resultant composite sheets 7 are molded in a similar fashion. After formation, each assembled composite sheet 7 (FIG. 27) is transported from assembly station 15 to the heat and pressure station 16, which comprises a pair of generally flat, heated platens 70 and 71 which are selectively converged and diverged. Since both platens 70 and 71 are heated, both sides of composite sheet 7 are contemporaneously heated to improve processing speed and heat uniformity. Composite sheet 7 is heated to a point that just softens or plasticizes the heat fusible fibers in backing sheet 8, so as to insure proper bonding between the various sheets 8-10 of composite sheet 7, and permit permanent molding of the same at forming station 17. The heating of composite sheet 7 is preferably as uniform as possible, and is a function of both time and temperature. Excess heat will cause backing sheet 8 to deteriorate and/or melt, whereas insufficient heat will not provide a secure bond between sheets 8-10, and will prevent composite sheets 7 from taking a permanent set at forming station 17. In one working embodiment of the present invention, operating parameters at heat and pressure station 19 in the range of 280° F. for 20 seconds to 400° F. for 10 seconds have been found to achieve acceptable results. Within this range, heating at 300° F. for 15 seconds has been found most beneficial for most standard types of cover panel sizes and shapes.

At the heat and pressure station 16 (FIG. 27), composite sheet 7 is also compressed between the interior and exterior sides of the composite sheet 7 from its original thickness. In one example of the present invention, the original assembled thickness of composite sheet 7 is reduced by approximately 30%-50%. For example, in one working embodiment of the present invention, the original overall assembly thickness of composite sheet 7 is approximately 0.180 inch, and after the heat and pressure step, the overall thickness is reduced to approximately 0.120 inch. The compression aspect of the heat and pressure step insures uniformity of the heating, adhesion between sheets 8-10, and adds rigidity or stiffness to the final cover panel 5.

After the heat and pressure step, the heated and compressed composite sheet 7 (FIG. 27) is immediately shifted into the forming station 17. Composite sheet 7 is preferably transferred as quickly as possible from heat and compression station 16 to forming station 17 without dislodging indexing between sheets 8-10, so that the heat fusible fibers in backing sheet 8 remain soft for molding.

Forming station 17 (FIG. 27) includes male and female mold halves 76 and 77, respectively, which are shaped to form a mold cavity 78 therebetween in the shape of the final cover panel configuration. The mold halves 76 and 77 are selectively converged and diverged in the manner described below to further compress composite sheet 7, and mold a three-dimensional part therefrom. It is to be understood that all heating, compressing and molding operations contemplated by the present invention could be performed at a single workstation. However, the multi-station arrangement disclosed herein provides improved processing speed.

With reference to FIGS. 1-10, cover panel 5 includes a flat or planar central portion 82 with integrally formed top, bottom and side flanges 83-86, respectively. In the illustrated example, flanges 83-86 are bent or molded inwardly at an angle of approximately 90° from the center portion 82 of cover panel 5 along associated crease lines, and define right angle corners 87-90 therebetween. Cover panel 5 has a predetermined geometrically solid shape, which in the illustrated example, is a five-sided, three-dimensional configuration wherein center area 82 is generally rectangular in front elevation, and flanges 83-86 are generally flat or planar. The top flange 83 includes a stepped area 91 defined by intersecting ledges 92 and 93. The bottom flange 84 of cover panel 5 also includes a stepped area 96 defined by intersecting ledges 94 and 95. The two stepped areas 91 and 96 extend continuously along the top and bottom flanges 83 and 84 of cover panel 5 and facilitate mounting cover panel 5 on frame 2 in the manner discussed in greater detail hereinafter.

Each of the side flanges 85 and 86 (FIG. 1) of cover panel 5 includes a fastener mounting strip 98 attached to an interior surface thereof. Each fastener mounting strip 98 comprises a thin band or ribbon of plastic material, having a plurality of square shaped apertures 99 (FIGS. 2-5) spaced uniformly along the length thereof to facilitate automatically indexing mounting strips 98. Fastener mounting strips 98 may be attached to cover panel 5 in a variety of conventional fashions, and are preferably molded directly to the interior surfaces of side flanges 85 and 86 at station 17 during the forming step, as described in greater detail hereinafter. The fastener mounting strips 98 are shaped and positioned so that they protrude outwardly from the marginal side edges of composite sheet 7 to expose an area on which fastener clips 100 can be attached. In the example illustrated in FIGS. 1-32, each fastener mounting strip 98 includes three clips 100 which are positioned to be received in the mating apertures 38 of panel frame 2. The illustrated clips 100 have a butterfly shape, with central retainer portion 101 crimped onto the fastener mounting strip 98 and a pair of outboard spring wings 102 shaped to be received in mating slots 38 with a snap-lock action. Mounting strips 98 not only retain clips 100, but they also serve as spacers to locate cover panel 5 on frame 2, and also serve to stiffen the side flanges 85 and 86 of cover panel 5. As discussed in greater detail below, the attachment of mounting strips 98 to the inside surfaces of side flanges 85 and 86 spaces the exterior surfaces of the side flanges laterally outwardly when cover panel 5 is attached to frame 2. As a result, when adjacent partition panels 1 are interconnected side-by-side, the adjacent side flanges 85 and 86 abut to form a very narrow, neat vertical joint line, as illustrated in FIG. 25, which is quite unobtrusive and not very noticeable. Mounting strips 98 also prevent side flanges 85 and 86 from being crushed, dented, or otherwise deformed after cover panel 5 is molded.

Figure 29:
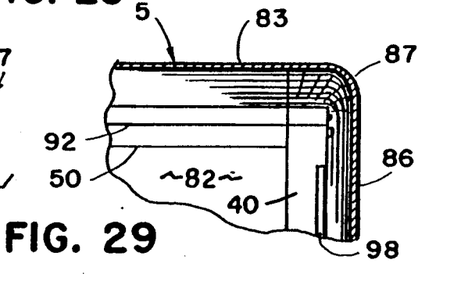
FIG. 29 is an enlarged, fragmentary rear elevational view of a corner portion of the molded cover panel.
Figure 30:
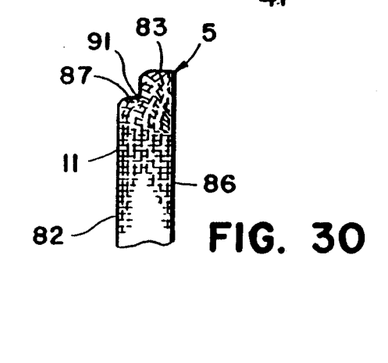
FIG. 30 is an enlarged, fragmentary, side elevational view of the corner portion of the cover panel.

With reference to FIG. 27, during the forming step, a pair of fastener mounting strips 98 are positioned on the interior surfaces of side flanges 85 and 86 when the mating mold halves 76 and 77 are separated. The mold halves 76 and 77 are then converged to form the flanges 83–86 of cover panel 5, as well as top and bottom ledges 92–95. During the molding step, the thickness of composite sheet 7 is further compressed, so as to insure the permanence of the geometrically solid shape of the formed panel, as well as reinforce the bonding between sheets 8–10. Furthermore, the compression process also attaches both fastener mounting strips 98 to the associated side flanges 85 and 86. Preferably, the thickness of composite sheet 7 is further compressed or reduced by approximately 40%–60% of the thickness of the composite sheet 7 as it exited the heat and pressure station. For example, in the working embodiment of the present invention noted above, wherein the original assembly thickness is 0.180 inch, and the compressed thickness after the heat and pressure station is 0.120 inch, the final thickness of the composite sheet 7 is approximately 0.060 inch, as illustrated in FIGS. 19–28. The overall compression of composite sheet 7 is carefully controlled so as to avoid any significant impairment to its acoustic or sound absorbing properties. Composite sheet 7 preferably remains perforate or open to air transmission. The compression aspect of the molding step also serves to neatly form the corners 87–90 of cover panel 5 without bunching of composite sheet 7. As best illustrated in FIGS. 29 and 30, the excess material at the corners of composite sheet 7 is compressed in all directions, so that the formed corner has neat smooth lines which are permanently set in the cover panel 5. Some post molding trimming of the cover panel corners 87–90 may be required, particularly when the composite sheet is not properly located between the mold halves 76 and 77.

The compression applied to composite sheet 7, in conjunction with the heat softened fibers and/or binders therein cause neat, clean crease lines to be permanently formed along the common edges of the cover panel flanges 83–86 and center portion 82. The formed crease lines can be either sharp corners, 4 radiused slightly to create tightly rounded edges 103 (FIG. 31) that blend in neatly with the associated portions of adjacent cover panels 5. While the illustrated cover panel 5 is generally planar in shape, it is to be understood that the present molding process is capable of producing a variety of other shapes, such as arcuate for curved corner panels, and the like.

The formed and further compressed composite sheet 7 is then cooled in the mold cavity 78, so that it permanently assumes the desired three-dimensional shape provided by the molding step. In one working example of the present invention, cover panel 5 is retained between mold halves 76 and 77 approximately 15 seconds to cool cover panel 5 to a temperature of around 70°–80° F. The compression of the composite sheet 7, in conjunction with the three-dimensional shape applied during the molding step, stiffens and rigidifies the one-piece frameless cover panel 5 to a degree which facilitates manually handling the same, and attaching the same to panel frame 2. The central portion 82 of cover panel 5 is relatively hard for good tackability characteristics, yet is not sufficiently closed through compression as to impair sound absorption and transmission.

In the illustrated embodiment of the present invention, a relatively thick and stiff sound absorbing material is also provided from which a sound absorbing sheet 105 (FIGS. 11 and 12) is cut. The sound absorbing sheet includes an exterior surface 106, an interior surface 107, and top, bottom and side marginal edges 108–111 respectively. Sound absorbing sheet 105 has a generally rectangular plan shape, and is sized commensurate with the central portion 82 of cover sheet 5. The interior surface 106 of sound absorbing sheet 105 is adhered to the interior surface 45 of backing sheet 8, so as to form the final cover panel 5. Sound absorbing sheet 105 is sized so that the peripheral edges of the interior surface 106 abut the exterior surfaces of the panel frame rails 20–23 to provide additional, more positive lateral support for the cover panel 5. The illustrated sound absorbing sheet 105 is approximately ⅜ inch thick with a density of around 7 pounds per cubic foot. Sound absorbing sheet 105 also includes a thin sheet 115 adhered to its interior surface 106 to create a "weak" or non-fixed septum for sound attenuation. Sheet 115 may be constructed from craft paper or the like, and in the illustrated example, comprises a sheet of aluminum foil having a thickness of around one mil.

Figure 11:
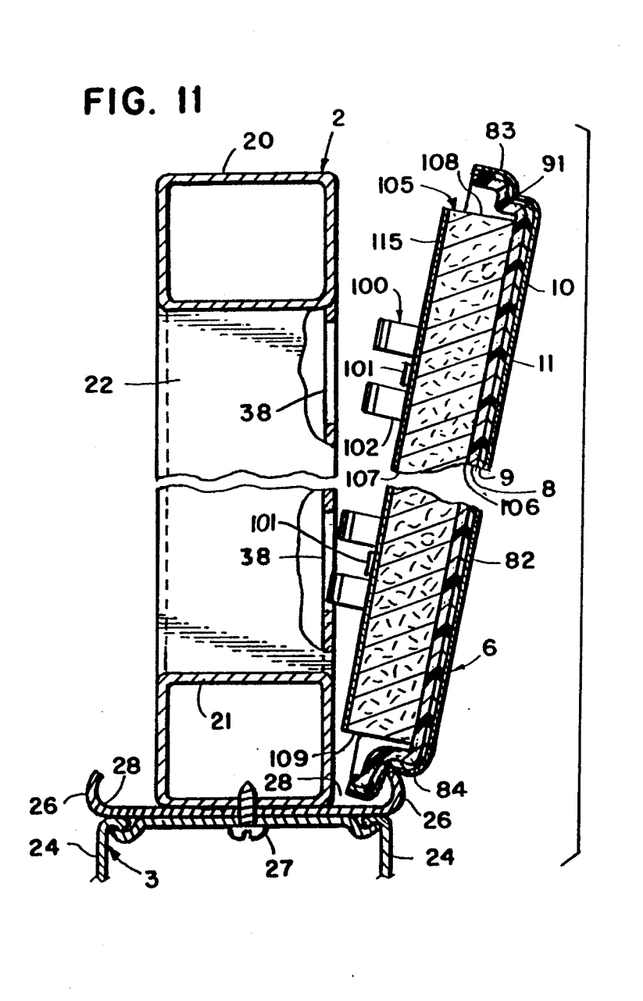
FIG. 11 is a fragmentary, vertical cross-sectional view of the panel construction, particularly showing a single cover panel partially installed on the panel frame.

In operation, cover panels 5 and 6 are attached to panel frame 2 in the following manner. As best illustrated in FIG. 11, the bottom flange 84 of cover panel 6 is inserted into the associated channel 28 of base plate 2 with the panel 6 oriented at an outwardly extending angle or incline to the installer. The right-hand flange 26 of base plate 25 is received in the lower stepped area 96 of cover panel 6, and abuts the vertical ledge 94 of the same to securely retain the lower portion of cover panel 6 in frame 2. The installer then pivots or rotates the upper portion of cover panel 6 upwardly toward the top rail 20 of panel frame 2, and inserts fastener clips 100 into the mating slots 38 in frame side rails 22 and 23 to achieve a snap-lock action. Cover panel 5 is then installed on the opposite side of panel frame 2 in a similar fashion, as shown in FIG. 12. Top cap 4 is then assembled on panel frame 2, so that spring clips 34 engage the mating slots 39 in top rail 20. The flanges 33 of top cap 4 are received into the upper stepped area 91 of cover panels 5 and 6, and abut the vertical ledges 92 of the same to securely retain the upper portions of the panels in frame 2. In this fashion, both the top and bottom portions of cover panels 5 and 6 are positively captured in the frame, with the side being retained in place by spring clips 100. A dead air space 118 (FIG. 12) is formed between the foil backings 115 of adjacent cover panels 5 and 6, and defines a sound attenuation chamber which is void of any fixed septum.

Figure 31:
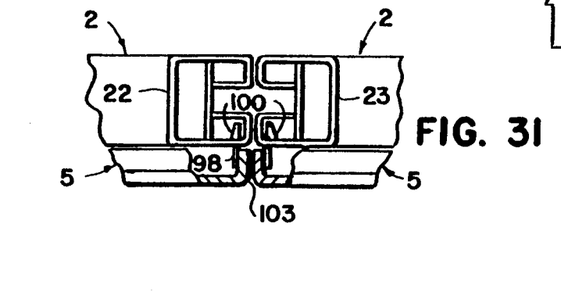
FIG. 31 is a fragmentary top plan view of a pair of adjacent partition panels with portions thereof broken away to reveal internal construction.
Figure 32:
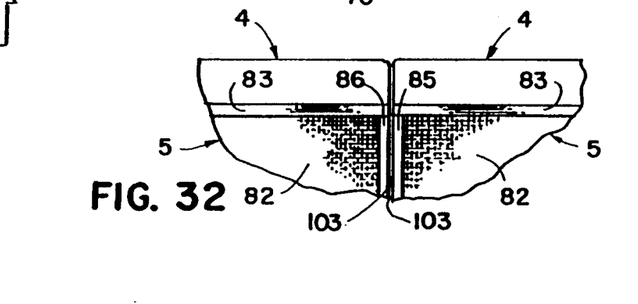
FIG. 32 is a fragmentary front elevational view of a pair of adjacent partition panels.

As best illustrated in FIGS. 31 and 32, when a row of partition panels 1 are interconnected in a side-by-side fashion, the side flanges 85 and 86 of adjacent cover panels 5 abut to form neat, very thin vertical lines therebetween, which is in clear contrast to conventional partition panels which require separate trim members or covers along the sides of the panels 1. The positioning of fastener mounting strips 98 on the inside surfaces of side flanges 85 and 86, in conjunction with the extreme outboard disposition of slots 38 on frame side rails 22 and 23 collectively achieve this mating, abutting relationship. The top trim members 4 of adjacent panels 1 are aligned, and form a clean, continuous horizontal edge along the upper portions of the cover panels 5. The resultant overall appearance of the assembled partition panels 1 is quite unique in that the cover panels 5 and 6 present a continuously flowing partition surface with neatly trimmed top and bottom edges, unlike conventional partitions where the end caps and frames create multiple vertical lines between each panel which impart a broken up appearance to the partition.

The rigidity or stiffness incorporated into cover panels 5 and 6 through heat compression and molding, as well as sound absorption sheet 105, keep cover panels 5 and 6 from sagging, even though they are hung or suspended on frame 2 by only their marginal edges. Despite their frameless construction, cover panels 5 and 6 will neither sag vertically, nor bow horizontally due to their stiffened, self-supporting design.

The detachable or removable connection of cover panels 5 and 6 to frame 2 permits damaged cover panels to be easily removed and replaced in field conditions by even unskilled personnel. In like manner, cover panels 5 and 6 can be replaced or reconfigured to change the colors and/or texture of the panel walls.

The reference numeral 1a (FIG. 33) generally designates another embodiment of the present invention having symmetrically configured cover panels that can be mounted in different orientations for purposes such as altering the appearance of the partition panel. Since the symmetrical panel arrangement 1a is similar to the previously described panel construction 1, similar parts appearing in FIGS. 1-12 and FIG. 33 respectively are represented by the same, corresponding reference numeral, except for the suffix "a" in the numerals of the latter.

In partition panel 1a (FIG. 33), both cover panels 5a and 6a have a symmetrical configuration, in both the longitudinal and transverse directions. Furthermore, the fastener clips 100a on cover panels 5a and 6a, as well as the mating fastener slots 38a on frame 2a are positioned in a symmetrical pattern. As a result, each cover panel 5a and 6a can be rotated end-for-end, or top-to-bottom, and still attach to an associated frame 2a.

Figure 33:
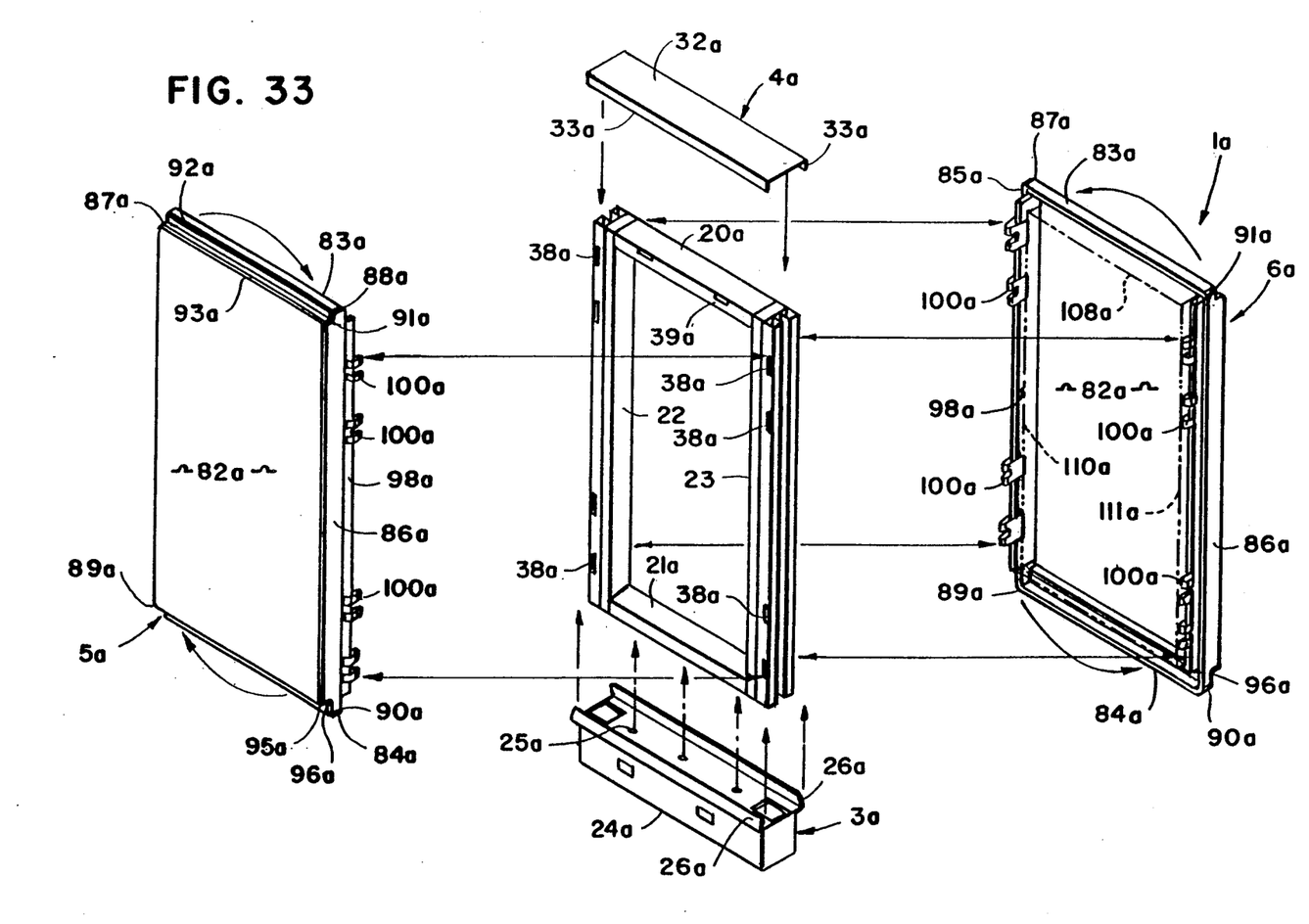
FIG. 33 is an exploded perspective view of another embodiment of a partition panel construction embodying the present invention.

Preferably, the cover panels 5a and 6a of symmetrical partition panel 1a have a directional fabric 10a of a type which creates or generates a first appearance when mounted on frame 2a at a first orientation, and a second, different appearance when mounted on frame 2a at a second orientation. For instance, fabric 10a may be of a sharkskin finish, which when oriented with one end up, has a very shiny or glossy appearance, and when oriented with the other end up, has a very dull or flat appearance. In this fashion the appearance of partition panel 1a can be altered by removing cover panels 5a and 6a, rotating the same end-for-end, or top-to-bottom, and then reattaching the same to frame 2a. Other types of directional fabrics and/or fabric finishes and textures may also be used to similarly impart a variable appearance to partition panel 1a.

The molded, one-piece, frameless cover panels 5 and 6 provide a overall partition construction which is economical to manufacture, and has a unique appearance. The formed cover panels 5 and 6, with their predetermined geometrically solid shape, and their heat compression molding process, possess a stiffness or rigidity which facilitates manual handling and attachment of the same to panel frame 2 without sagging or bowing. Cover panels 5 and 6 are quite lightweight, and can be readily detachably connected with panel frame 2 even by unskilled personnel, so as to facilitate color and texture coordination and reconfiguration.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows.

1. A method for making acoustic cover panels for portable room partitions of the type having a freestanding frame with at least one acoustic cover panel connected with an enclosing an associated side of the frame, said method comprising:

providing a non-woven backing material of the type having adjacent fibers interconnected by heat fusible means;

cutting a backing sheet from the backing material to a predetermined shape with a marginal edge;

providing an upholstery material having a finished exterior surface;

cutting an upholstery sheet from the upholstery material to a predetermined shape with a marginal edge and a size commensurate with the backing sheet;

assembling the backing sheet and the upholstery sheet by positioning an interior side of the upholstery sheet on an exterior side of the backing sheet.

adhering the interior side of the upholstery sheet to the exterior side of the backing sheet to define a composite sheet with a marginal edge;

heating the composite sheet to soften the heat fusible means in the backing sheet;

forming the heated composite sheet by creasing outer portions of the composite sheet along predetermined crease lines spaced inwardly from the marginal edge of the composite sheet to form integral flanges which are bent inelastically inwardly from the crease lines at a selected angle to the remaining generally planar portion of the composite sheet to create a one-piece, frameless molded cover panel with a predetermined, tray-like shape adapted to mate with and cover one side of the panel frame;

cooling the composite sheet while in the predetermined tray-like shape, such that the composite sheet permanently assumes the predetermined tray-like shape, which serves to stiffen and rigidify the one-piece, frameless cover panel to a degree which facilitates manual handling of the same and attachment to the panel frame, yet permits selected flexure along at least one of the flanges to facilitate mating abuttment with either the frame or an adjacent one of the cover panels.

2. A method as set forth in claim 1, wherein:
said sheet forming step includes compressing the composite sheet a predetermined amount between opposite sides thereof while the composite sheet is heated, so as to further rigidify the formed cover panel and permanently retain its shape, without significantly impairing the acoustical properties of the backing sheet.

3. A method as set forth in claim 2, wherein:

said sheet heating step comprises applying heated platens contemporaneously to both sides of the composite sheet.

4. A method as set forth in claim 3, wherein:
said sheet heating step includes compressing the composite sheet a predetermined amount between the sides of the composite sheet to bond the same.

5. A method as set forth in claim 4, including:
applying strips of resin along top and bottom edges of the interior surface of the backing sheet prior to said assembling step, so as to stiffen associated marginal portions of the composite sheet along which the crease lines extend.

6. A method as set forth in claim 5, including:
applying stiffening strips along opposite side edges of the interior surface of the backing sheet prior to said assembly step, but after said resin applying step, so as to stiffen associated marginal portions of the composite sheet along which the crease lines extend.

7. A method as set forth in claim 6, including:
providing a fire retardant material;
cutting a protective sheet from the fire retardant material to a predetermined shape with a marginal edge and a size commensurate with the backing sheet and the upholstery sheet; and wherein said assembling step includes positioning the protective sheet in between the backing sheet and the upholstery sheet, and indexing the marginal edge of the protective sheet in a generally aligned relationship with the marginal edges of the backing sheet and the upholstery sheet.

8. A method as set forth in claim 7, wherein:
said cutting steps which form the backing sheet, the protective sheet and the upholstery sheet each include trimming the marginal edge of the associated backing sheet, protective sheet and upholstery sheet, such that the marginal edges of the formed cover panel are prefinished, and do not require trimming after said cooling step.

9. A method as set forth in claim 8, including:
interconnecting the protective sheet, and the backing sheet prior to said forming step in a manner which at least temporarily retains the marginal edges of the same aligned during said forming step.

10. A method as set forth in claim 8, wherein:
said backing sheet cutting step comprises cutting the backing sheet to a generally rectangular plan shape with top, bottom and opposite side edges;
said protective sheet cutting step comprises cutting the protective sheet to a generally rectangular plan shape with top, bottom and opposite side edges; and
said upholstery sheet cutting step comprises cutting the upholstery sheet to a generally rectangular plan shape with top, bottom and opposite side edges, whereby the cover panel assumes a five-sided, three-dimensional shape, comprising a rectangular central planar portion with a generally planar top, bottom and opposite side flanges integral therewith.

11. A method as set forth in claim 10, wherein:
the backing material, the fire retardant material, and the upholstery material are provided in a preassembled roll of laminate material; and
said cutting steps for the backing sheet, the protective sheet and the upholstery sheet are performed substantially contemporaneously by cutting the same from the preassembled roll of laminate material.

12. A method as set forth in claim 11, including:
providing a relatively thick and stiff sound absorbing material;
cutting a sound absorbing sheet from the sound absorbing material to a generally rectangular plan shape with top, bottom and opposite side edges, and a size generally commensurate with the planar portion of the cover panel;
attaching the sound absorbing sheet to an interior side of the planar portion of the cover panel after said cooling step to provide additional rigidity and sound attenuation to the frameless cover panel.

13. A method as set forth in claim 12, including:
attaching fasteners to the opposite side edges of the cover panel to detachably mount the cover panel on one side of the frame.

14. A method as set forth in claim 13, wherein:
said fastener attaching step includes positioning the fasteners in a symmetrical pattern on the opposite side edges of said cover panel to permit said cover panel to be removed from the frame, rotated top-to-bottom, and then reattached to the frame.

15. A method as set forth in claim 14, wherein:
said upholstery material providing step comprises providing a directional fabric which imparts a first appearance when disposed in a first orientation, and a second, different appearance when disposed in a second orientation, such that at least one of the cover panels can be removed from the frame, rotated top-to-bottom, and reattached to the frame to alter the appearance of the partition panel associated with the one cover panel.

16. A method as set forth in claim 15, wherein:
said fastener attaching step includes adhering fastener mounting strips to interior faces of the opposite side edges of the backing sheet during said sheet forming step.

17. A method as set forth in claim 16, wherein:
said backing material providing step comprises providing a sheet of non-woven polyester material.

18. A method as set forth in claim 17, wherein:
said fire retardant material providing step comprises providing a sheet of non-woven fiberglass material.

19. A method as set forth in claim 18, wherein:
said upholstery material providing step comprises providing a sheet of conventional woven textile material.

20. A method as set forth in claim 19, wherein:
said sheet forming step includes forming a bottom ledge in the bottom flange of the cover panel which extends thereacross, and is shaped to be received against and captured by a mating base flange in the frame to retain the same therein.

21. A method as set forth in claim 20, wherein:
said sheet forming step includes forming a top ledge in the top flange of the cover panel which extends thereacross, and is shaped to be received against and captured by a mating top cap flange on the frame to retain the same therein.

22. A method as set forth in claim 1, wherein:
said sheet heating step comprises applying heated platens contemporaneously to opposite sides of the composite sheet.

23. A method as set forth in claim 1, wherein:

said sheet heating step includes compressing the composite sheet a predetermined amount between opposite sides of the composite sheet.

24. A method as set forth in claim 1, including:
applying strips of resin along top and bottom edges of the interior surface of the backing sheet prior to said assembling step, so as to stiffen associated marginal portions of the composite sheet along which the crease lines extend.

25. A method as set forth in claim 1, including:
applying stiffening strips along opposite side edges of the interior surface of the backing sheet prior to said assembly step, so as to stiffen associated marginal portions of the composite sheet along which the crease lines extend.

26. A method as set forth in claim 1, including:
providing a fire retardant material;
cutting a protective sheet from the fire retardant material to a predetermined shape with a marginal edge and a size commensurate with the backing sheet and the upholstery sheet; and wherein said assembling step includes positioning the protective sheet in between the backing sheet and the upholstery sheet, and indexing the marginal edge of the protective sheet in a generally aligned relationship with the marginal edges of the backing sheet and the upholstery sheet.

27. A method as set forth in claim 1, wherein:
said cutting steps which form the backing sheet, the protective sheet and the upholstery sheet each include trimming the marginal edge of the associated backing sheet, protective sheet and upholstery sheet, such that the marginal edges of the formed cover panel are prefinished, and do not require trimming after said cooling step.

28. A method as set forth in claim 1, including:
interconnecting the upholstery sheet and the backing sheet prior to said forming step in a manner which at least temporarily retains the marginal edges of the same aligned during said forming step.

29. A method as set forth in claim 1, wherein:
said backing sheet cutting step comprises cutting the backing sheet to a generally rectangular plan shape with top, bottom and opposite side edges; and
said upholstery sheet cutting step comprises cutting the upholstery sheet to a generally rectangular plan shape with top, bottom and opposite side edges.

30. A method as set forth in claim 1, wherein: the backing material, and the upholstery material are provided in a preassembled roll of laminate material; and
said cutting steps for the backing sheet, and the upholstery sheet are performed substantially contemporaneously by cutting the same from the preassembled roll of laminate material.

31. A method as set forth in claim 1, including:
providing a relatively thick and stiff sound absorbing material;
cutting a sound absorbing sheet from the sound absorbing material to a generally rectangular plan shape with top, bottom and opposite side edges, and a size generally commensurate with the planar portion of the cover panel;

32. A method as set forth in claim 1, including:
attaching fasteners to the opposite side edges of the cover panel to detachably mount the cover panel on one side of the frame.

33. A method as set forth in claim 1, including:
attaching fasteners in a symmetrical pattern to the opposite side edges of said cover panel to permit said cover panel to be removed from the frame, rotated top-to-bottom, and then reattached to the frame.

34. A method as set forth in claim 1, wherein:
said upholstery material providing step comprises providing a directional fabric which imparts a first appearance when disposed in a first orientation, and a second, different appearance when disposed in a second orientation, such that at least one of the cover panels can be removed from the frame, rotated top-to-bottom, and reattached to the frame to alter the appearance of the partition panel associated with the one cover panel.

35. A method as set forth in claim 1, including:
adhering fastener mounting strips to interior faces of the opposite side edges of the backing sheet during said sheet forming step.

36. A method as set forth in claim 1, wherein:
said backing material providing step comprises providing a sheet of conventional woven textile material.

37. A method as set forth in claim 1, wherein:
said upholstery material providing step comprises providing a sheet of conventional woven textile material.

38. A method as set forth in claim 1, wherein:
said sheet forming step includes forming a bottom ledge along a bottom edge of the cover panel which is shaped to be received against and captured by a mating base flange in the frame to retain the same therein.

39. A method as set forth in claim 1, wherein:
said sheet forming step includes forming a top ledge along a top edge of the cover panel which is shaped to be received against and captured by a mating top cap flange on the flange to retain the same therein.

* * * * *

UNITED STATES PATENT AND TRADEMARK OFFICE
CERTIFICATE OF CORRECTION

PATENT NO. : 5,111,579
DATED : May 12, 1992
INVENTOR(S) : Carl W. Andersen

It is certified that error appears in the above-identified patent and that said Letters Patent is hereby corrected as shown below:

Column 2, line 16:
        After "backing material" insert --.--.
    Column 5, line 20:
        After "5 and 6" insert --.--.
    Column 12, line 37:
        "base plate 2" should be --base plate 26--.
    Column 13, line 65:
        "provide a" should be --provide an--.
    Column 14, line 20:
        "with an" should be --with and--.
    Column 18, line 53, claim 39:
        "flange" (second occurrence) should be --frame--.

Signed and Sealed this

Fifth Day of October, 1993

Attest:

BRUCE LEHMAN

*Attesting Officer*    *Commissioner of Patents and Trademarks*